Sept. 28, 1954     A. W. BECKER     2,690,094
WARNING REFLECTOR FOR VEHICLES
Filed Oct. 6, 1949
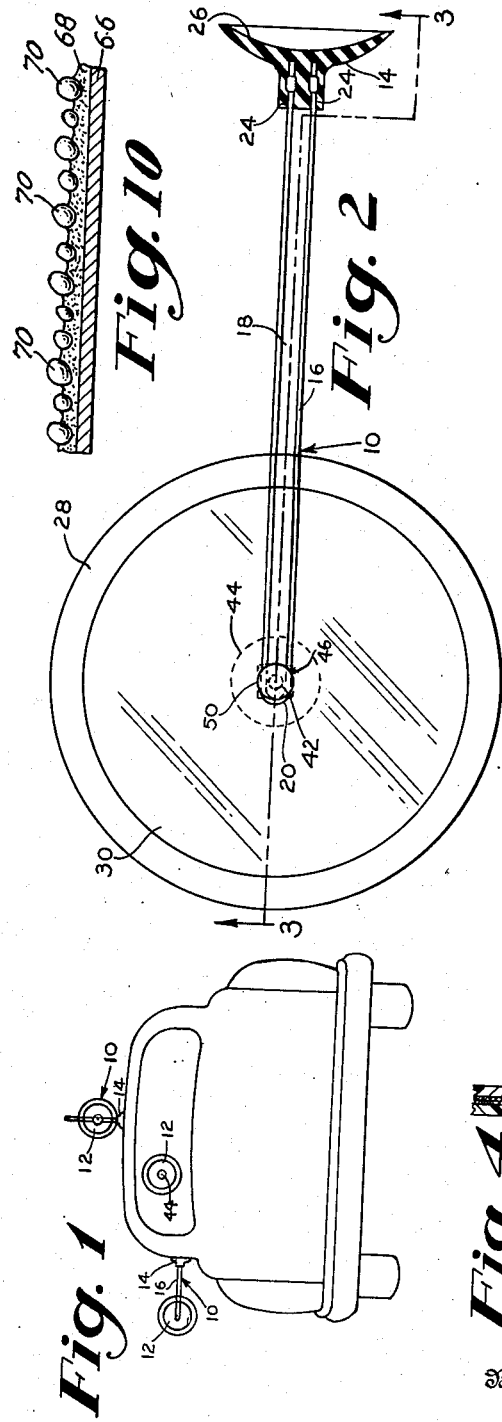
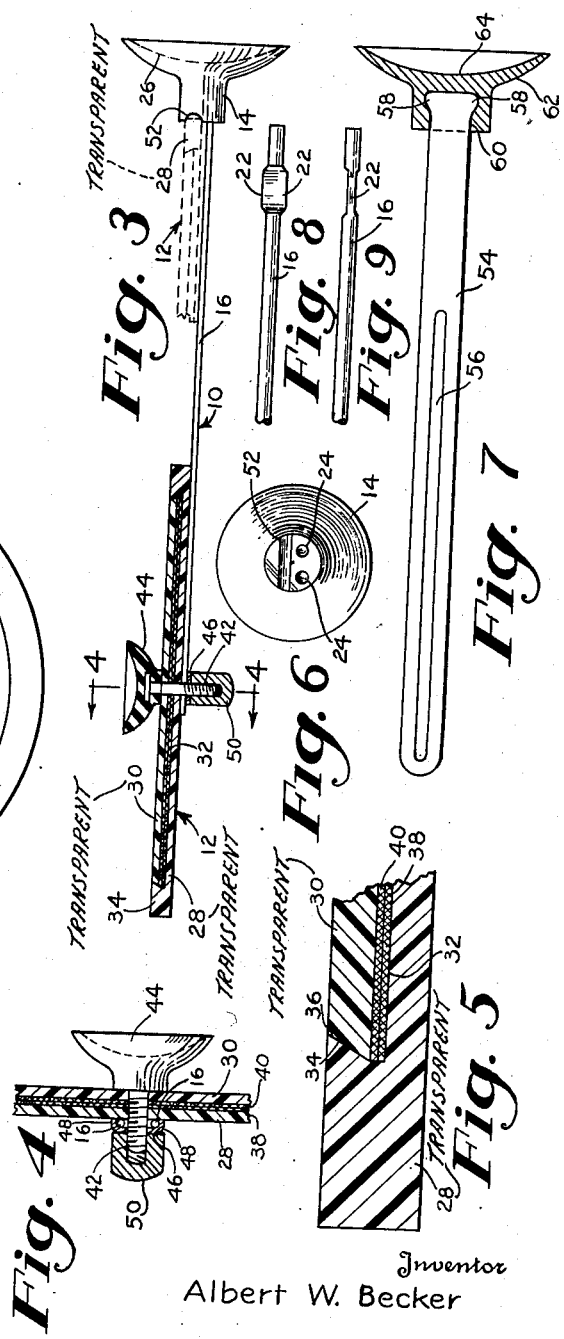
Inventor
Albert W. Becker
By Lindsey, Prutzman and Sweet
Attorneys Patented Sept. 28, 1954

2,690,094

UNITED STATES PATENT OFFICE 2,690,094

WARNING REFLECTOR FOR VEHICLES

Albert W. Becker, Hartford, Conn., assignor to The Automotive Safety Device Company, Hartford, Conn., a corporation of Connecticut Application October 6, 1949, Serial No. 119,834

3 Claims. (Cl. 88—81)

This invention relates to improvements in warning reflectors for vehicles and, more particularly, to warning reflectors adapted to be used on parked, disabled vehicles for purposes of warning approaching vehicles of the presence thereof. In the dark, it is usually difficult to see vehicles parked beside a roadway, especially if the lights of the disabled vehicle are not on. Even if the lights of the parked vehicle are on, it is frequently still difficult for the drivers of approaching vehicles to see such parked vehicles. During inclement weather such as fog, sleet, rain, mist, or snow, parked vehicles present even greater hazards to passing vehicles in the dark and even otherwise.

It is the object of the present invention to provide a reflector which may be conveniently and compactly stored in any vehicle in any convenient place, such as a glove compartment, and quickly be prepared for mounting said reflector on the exterior of the vehicle should parking thereof beside a roadway be required, as when it is necessary to make repairs on the vehicle, change a flat tire, and also when vehicular accidents occur.

It is another object of the invention to provide a warning reflector for use on wrecked or parked vehicles so that the reflector will effectively and efficiently reflect light from approaching vehicles and thus warn the drivers of said approaching vehicles of the presence of the parked vehicle.

It is still another object of the invention to provide such warning reflectors with suction cup means by which the reflector may be firmly, though temporarily, mounted on the top or side of a parked vehicle, on a side front or rear window thereof, or on a fender of such parked vehicle, and the supporting means for the reflector element comprises a flexible arm, whereby wind or the rush of air from a passing vehicle will serve to wave the reflector element and thus render it more effective in warning approaching vehicles of the existence of the parked vehicle.

Still another object of the invention is to construct the reflector so that sheets of opaque, highly light reflective material may be mounted back to back between disks of transparent material, such as transparent synthetic resins, the transparent material serving to maintain the light reflective material in clean condition for efficiently reflecting the light of approaching vehicles back to said vehicles.

One further object of the invention is to construct the reflector so that the reflecting element thereof may be adjusted longitudinally of a supporting arm and thus enable the light reflecting element to be disposed at various distances from the vehicle.

Details of these objects and of the invention, as well as other objects thereof are set forth in the following specification and illustrated in the accompanying drawing forming a part thereof.

In the drawing,

Fig. 1 is a rear view of an automobile on which a reflector embodying the principles of the present invention is mounted in a number of different exemplary positions on said automobile.

Fig. 2 is a side elevation, partly in section, illustrating the details of the reflector comprising the present invention.

Fig. 3 is a sectional view taken on the line 3—3 of Fig. 2.

Fig. 4 is a fragmentary sectional view taken on the line 4—4 of Fig. 3 and being illustrated on a larger scale than Fig. 3.

Fig. 5 is an enlarged fragmentary sectional view showing a detail of the light reflective member per se of the invention.

Fig. 6 is a top plan view of the suction cup per se illustrated in Figs. 1 through 3 for holding the reflector in engagement with the vehicle.

Fig. 7 is a side elevation, partly in section of another embodiment of an arm for supporting the light reflective element of the invention.

Figs. 8 and 9 are respectively fragmentary plan and side views of the ends of the wire supporting arm illustrated in Figs. 1 through 3.

Fig. 10 is an exemplary fragmentary sectional view of a portion of reflective sheet material such as used in the reflector mechanisms illustrated in the foregoing figures.

Referring to the drawings, Fig. 1 illustrates the rear view of an automobile having mounted in exemplary manner on the top thereof a warning reflector 10 embodying the present invention, the light reflective element 12 thereof being disposed in engagement with one end of the suction cup 14 by which the reflector is held in engagement with the top of the vehicle. Said figure also illustrates another exemplary mounting of a reflector 10, the same being mounted adjacent one side of the automobile but, in this instance, said reflector has the light reflective element 12 thereof disposed in extended position relative to supporting arm 16 of the reflector. This latter position is particularly useful when a tire on the left side of the automobile, as viewed in Fig. 1, requires changing.

Referring to Figs. 2 and 3, the details of the reflector 10 are shown to better advantage. In the embodiment shown in these figures, the arm 16 comprises a wire, preferably of spring steel, of any suitable size such as about 1/16 inch in diameter, said wire being bent upon itself to provide a pair of wires slightly spaced apart so as to provide between said wires a slot or space 18 extending longitudinally of the arm. The bent end 20 of the wire defines the outer end of the slot 18. The free ends of the wire are preferably stamped or otherwise deformed to provide opposed projections 22 as shown in Figs. 8 and 9. The wire ends having the projections 22 are forced into suitable parallel sockets or apertures 24 extending inward from the outer end of the suction cup 14 in opposition to the concave suction face 26 of said cup. Suction cup 14 is formed from any suitable flexible rubber-like material and, when the ends of the wires having the projections 22 are forced into the apertures or sockets 24, the projections will further deform and firmly engage the walls of said cavities and serve to prevent ready detachment of the arm 16 from the suction cup 14. If desired, the ends of the wire arm 16 may be firmly united to the suction cup 14 by using suitable cement adhesive to permanently adhere the suction cup and wire together. The wire arm 16 is preferably sufficiently resilient to be flexible but not readily bendable so as to deform the shape thereof. Thus, piano wire, for example, is highly suitable for forming the arm 16.

The light reflective element 12 is preferably formed from transparent material having a circular outline, the element comprising two disks 28 and 30. Disk 28 is larger in diameter than disk 30 and both of said disks are preferably formed from transparent synthetic resinous material, such as polystyrene or methyl-methacrylate, the latter being sold in the trade under the name Lucite. The disk 28 is provided with a shallow, circular recess 32 into which the smaller disk 30 closely fits. The walls of the recess are preferably undercut, as shown at 34 in Fig. 5, and the perimeter of disk 30 is beveled, as shown at 36, to be complementary to the undercut wall 34 of the disk 28. The disk 30 may be flexed or dished to contract the perimeter for purposes of inserting the same into the cavity 32 of disk 28, the disk 30 then being released so that the beveled perimeter 36 thereof may firmly and frictionally engage the undercut wall 34 of the disk 28.

Prior to inserting the disk 30 within the cavity 32, preferably two disk-like sheets 38 and 40 of different colored, highly light reflective, opaque material are placed within the cavity 32, the sheets 38 and 40 being mounted back to back so that the light reflective surface of each sheet is outermost. For example, one sheet may be colored red while the other is silver colored. Suitable material for forming said light reflective material is sold in the trade under the name "Scotch Lite," the details of said material being described in one or more patents including Nos. 2,294,930, 2,326,634, 2,354,018, and 2,354,048. From said patents it will be found that said material comprises reflector means such as illustrated in Fig. 10. Said reflector means may be constructed in various ways but essentially it is composed of an exemplary suitable thin light reflective backing sheet 66 to which a bead-bonding layer 68 is applied. Said layer may be suitably pigmented if desired. A layer of small transparent spheres or beads 70 of glass or resin is applied to said layer 68 and are bonded thereby to sheet 66. Said spheres serve to produce reflex reflection which causes a light ray directed toward said light reflective backing sheet to be returned toward the source of said ray as an outwardly diverging cone of brilliant light. This material is highly effective for reflecting light and, while sheets thereof reflect light with greatest efficiency when the light source is directly in front of said sheet, it nevertheless will reflect light directed even at a substantial angle to the plane of the sheet, the light rays from the source of light being reflected back to the source of the light even when directed to the reflector from such aforementioned angle. The beads 70 are disposed closely together and produce a substantially continuous surface which reflects light in a brilliant, over-all manner, even when the light originates at a relatively acute angle to the plane of the sheet 38 or 40, due primarily to the reflex reflective nature of said sheets as described above.

The disks 28 and 30 and sheets 38 and 40 are centrally apertured for purposes of receiving a bolt 42. The head of the bolt is preferably embedded within and united with a small rubber suction cup 44 and the free end of the bolt 42 passes through the slot 18 between the spaced wires of the arm 16. The bolt 42 also passes through a flat washer 46 which is preferably rectangular in outline, as shown in Fig. 2. Two opposed edges of said washer are bent to provide substantially parallel sides 48 which partially overhang the wires comprising the arm 16, as clearly shown in Fig. 4, and prevent the wires from spreading. A knurled nut 50, or wing nut, is threaded onto the outer end of bolt 42 for purposes of clamping the arm 16 between disk 28 of light reflective element 12 and washer 46. It will thus be seen that the reflective element 12 may be moved longitudinally of the arm 16 upon loosening the nut 50, and when the desired position of the reflective element on the arm is reached, the nut 50 may be tightened to hold the element in firm engagement with the arm as desired. The smooth, round contour of the wires comprising arm 16 will not scratch or mar the surface of disk 28.

When the assembled reflector 10 is mounted on a vehicle, and particularly the side thereof, as shown at the left in Fig. 1, with the reflective element 12 mounted at or near the curved end 20 of the arm 16, the element 12 will be subjected to a certain amount of waving from the wind or rush of air from passing vehicles, as indicated in dotted lines in Fig. 1. Thus the waving reflective element 12 will serve more effectively to warn approaching vehicles of a parked vehicle.

If desired to position the reflective element 12 so as to be substantially rigidly positioned relative to suction cup 14, the reflective element 12 may be moved toward the suction cup 14 until the perimeter of the disk 28 is in engagement with the end of the suction cup 14 opposite the suction face 26 thereof as shown in dotted lines in Fig. 3. Said end of the suction cup is preferably provided with a transverse notch or recess 52 into which the perimeter of the disk 28 may be disposed to prevent the reflective element 12 from moving appreciably relative to the suction cup 14. Said notch 52 is also illustrated in Fig. 6.

The rim portion of disk 28 between the perimeter of said disk and the edges of the recess 32 is not used for purposes of reflecting light, and, therefore, the area of said rim portion may be used for purposes of bearing advertising material or for placing thereon instructions as to the manner in which the warning reflector is to be used.

The reflector comprising the present invention is also adapted effectively to be mounted on either the front or rear bumper of an automobile by placing the arm 16 in back of the bumper and raising the suction cup 14 until the flange thereof engages the lower edge of the bumper. The reflective element 12 is then moved along the arm 16 toward the suction cup and the arm 16 is flexed so that the element 12 may extend somewhat over the upper part of the outer surface of the bumper. Nut 50 is then tightened to hold element 12 in said position relative to arm 16.

The light reflective element 12 may also be disengaged from the arm 16, if desired, by either removing the nut 50 from the bolt 42 or by loosening said nut 50 sufficiently to permit the spaced wires comprising the arms 16 to be spread sufficiently to permit the nut 50 and washer 46 to pass therethrough. The reflective element 12 per se may then be mounted by means of the suction cup 44 adjacent one of the windows of the vehicle. In Fig. 1, a reflective element 12 is shown mounted by cup 44 in the rear window of an automobile. When mounted in this position, one of the sheets 38 or 40 of reflective material will be disposed rearwardly of the automobile and the other will be disposed forwardly. Assuming that the red sheet of reflective material is disposed rearwardly, the silver sheet will be disposed forwardly. Under these conditions, the light from vehicles approaching from the rear of the parked vehicles will be reflected rearwardly of the latter and the light from vehicles approaching the forward end of the parked vehicle will pass through the windshield of the latter and be reflected against the silver reflective sheet of the element 12 and back through the windshield of the parked vehicle to the approaching vehicle. The single element 12 mounted in the rear window of the parked vehicle thus serves to reflect light in a warning manner from both the rear and front ends of the parked vehicle.

Further, the light reflective element 12, per se, may be made in such proportions as to be useful on the lenses of rear lights of a vehicle or otherwise, the same being attachable thereto by the suction cup 44. Such a reflector could also be used on the lense of a hand flashlight used by pedestrians walking along highways to save the batteries of the flashlight. Likewise, such reflectors could be similarly used on such vehicles as bicycles and motorcycles.

Even though the conventional lights of a parked vehicle may be used while the vehicle is parked or disabled, warning reflectors of the type embodying the present invention are, nevertheless, useful and effective greatly to supplement the lights of the parked vehicle to warn approaching vehicles of the position of the parked vehicle, especially in inclement weather when vision is poor, since the reflective sheets 38 and 40 utilized by the present invention are highly effective to reflect light to approaching vehicles during inclement weather of all kinds. Further, the character of the light reflected by such sheets 38 and 40 is of a different nature than the light shining from the lights of the parked vehicle and such different types of light serve further to attract the attention of approaching vehicles.

The arm 16 for supporting the light reflective element 12 may be formed in other ways than illustrated in Figs. 1 through 3. One further embodiment of a suitable arm is shown in Fig. 7, wherein the arm 54 is formed from a flat strip of spring steel, for example, an elongated slot 46 being formed therein for purposes of receiving the bolt 42 of the light reflective element 12. One end of the arm 54 is preferably provided with projections 58 at each side thereof for purposes of engaging the inner ends of the walls of a narrow slot-like socket 60 formed in the end of the suction cup 62 opposite the suction surface 64 thereof. Projections 58 will serve to effectively permit disengagement of the arm 54 from the suction cup 62. The end of the arm inserted in the socket 60 may be united to the walls thereof, if desired, by suitable cement which will unite rubber to steel, for example.

Further, the reflective element 12 may be used, when detached from the arm 16 as described above, by attaching the suction cup 44 thereof to the front lens of a head light of a vehicle as when the lamp of the head light is burned out or, for any other reason, is not lit. Light from approaching vehicles will be reflected by the reflective member 12 and thus serve to indicate the position of the non-functioning head light to the driver of the approaching vehicle. Inasmuch as the bolt 42 may be removed from the central apertures of the disks 28 and 30 and thereby permit the suction cup 44 to be mounted adjacent either of the disks 28 or 30, the desired color of light reflective material 38 or 40 may be disposed outermost relative to the suction cup 44.

It will thus be seen that the foregoing invention provides a warning reflector for use on parked vehicles which are disabled or otherwise, said reflector reflecting the light of approaching vehicles back to them to indicate the presence of the parked vehicle. The warning reflector is provided with means for attaching it to numerous positions on the parked vehicles and the reflector is arranged to be waved by either the rush of air produced by passing vehicles or the wind so as to more effectively indicate the presence of the parked vehicle. The reflector, including its reflective element and supporting means, are durable, simple, and inexpensive to manufacture and the useful life thereof is relatively long. The light reflective sheets employed in the reflective element are protected against damage and the accumulation of grime and other matter which normally tends to diminish the reflective powers of such material, whereby the efficiency of the reflective element is continually maintained at a high degree.

While the invention has been illustrated and described in its preferred embodiment and has included certain details, it should be understood that the invention is not to be limited to the precise details herein illustrated and described since the same may be carried out in other ways, falling within the scope of the invention as claimed.

I claim as my invention:

1. A warning reflector for use on vehicles and comprising in combination, a substantially flat light reflective member, an elongated arm comprising two substantially parallel flexible wires spaced apart and connected together at one end, the flexibility of said wires permitting limited waving of said reflective member in a direction perpendicular to said member, a bolt extending substantially centrally through said reflective member and through the space between said wires, and a suction cup provided in one end with a pair of parallel sockets, the free ends of said wires being inserted in said sockets in tight engagement with the walls thereof to connect said arm to said suction cup and the rim of the suction face of said cup being in a plane extending transversely to said arm.

2. A warning reflector for use on vehicles and comprising in combination, a substantially flat light reflective member, an elongated arm comprising two substantially parallel flexible wires spaced apart slightly and connected together at one end, the flexibility of said wires permitting limited waving of said reflective member in a direction perpendicular to said member, a bolt extending substantially centrally through said reflective member and through the space between said wires, a nut on the end of said bolt extending beyond said wires, a washer member between said wires and said nut, two opposed edges of said washer member being bent partially around said wires to prevent spreading thereof, and a suction cup provided in one end with a pair of parallel sockets, the free ends of said wires being inserted in said sockets in tight engagement with the walls thereof to connect said arm to said rim of the suction cup and the suction face of said cup being in a plane extending transversely to said arm.

3. A reflector means comprising in combination a relatively thin and flat transparent synthetic resinous disc having a shallow circular cavity of substantial width and uniform depth centrally disposed in one surface thereof, a thin light reflective sheet member positioned in the bottom of said cavity, said sheet member comprising a thin reflective backing sheet to which a layer of transparent beads are affixed to produce a continuous surface capable of reflex reflection of light rays directed toward said sheet member at angles ranging from very acute to perpendicular to the plane of said reflective sheet, a second disc of thin and flat synthetic transparent resinous material closely complementary in shape and thickness to said cavity and disposed therein closely and flatly against said sheet member, said reflective sheet being positionable between said transparent discs selectively with the beaded surface of said sheet against either disc and said discs and sheet also being apertured substantially centrally, fastening means extending through said apertures and engaging the outer surfaces of said discs to hold the same firmly and tightly assembled as aforesaid so as to protect said sheet member and hold it firmly in operative position within said cavity, and supporting means for said reflector connected to said fastening means.

References Cited in the file of this patent

UNITED STATES PATENTS

| Number | Name | Date |
|---|---|---|
| 1,158,005 | Richards | Oct. 26, 1915 |
| 1,757,816 | Shoup | May 6, 1930 |
| 1,987,357 | Bergen et al. | Jan. 8, 1935 |
| 2,049,069 | Martin | July 28, 1936 |
| 2,091,203 | Hay | Aug. 24, 1937 |
| 2,145,836 | Parkins | Jan. 31, 1939 |
| 2,146,859 | Seklehner | Feb. 14, 1939 |
| 2,181,926 | Tiger | Dec. 5, 1939 |
| 2,200,167 | Goldberg | May 7, 1940 |
| 2,215,829 | Evans | Sept. 24, 1940 |
| 2,226,159 | De Hoffman | Dec. 24, 1940 |
| 2,292,715 | Peden | Aug. 11, 1942 |
| 2,341,960 | Tabellione | Feb. 15, 1944 |
| 2,361,287 | Gustin | Oct. 24, 1944 |
| 2,484,142 | Arnold | Oct. 11, 1949 |

FOREIGN PATENTS

| Number | Country | Date |
|---|---|---|
| 548,234 | France | Oct. 16, 1922 |
| 339,404 | Great Britain | Dec. 11, 1930 |
| 421,321 | Great Britain | Dec. 18, 1934 |
| 374,505 | Italy | Aug. 26, 1939 |